(12) United States Patent  
Park et al.

(10) Patent No.: US 8,427,436 B2  
(45) Date of Patent: Apr. 23, 2013

(54) TOUCH SENSOR USING CAPACITANCE DETECTION AND LIQUID CRYSTAL DISPLAY HAVING THE SAME

(75) Inventors: Hyun-Sang Park, Seongnam-si (KR); Min-Koo Han, Seoul (KR); Jae-Hoon Lee, Seoul (KR); Bong-Hyun You, Yongin-si (KR); Byoung-Jun Lee, Cheonan-si (KR)

(73) Assignee: Samsung Display Co. Ltd., Gwanak-Gu, Seoul (KR)

( * ) Notice: Subject to any disclaimer, the term of this patent is extended or adjusted under 35 U.S.C. 154(b) by 882 days.

(21) Appl. No.: 12/327,378

(22) Filed: Dec. 3, 2008

(65) Prior Publication Data

US 2010/0013788 A1   Jan. 21, 2010

(30) Foreign Application Priority Data

Jul. 16, 2008  (KR) ..................... 10-2008-0069248

(51) Int. Cl.  
  *G06F 3/041* (2006.01)
(52) U.S. Cl.  
  USPC ........................................................ 345/173
(58) Field of Classification Search ........... 345/173–174  
  See application file for complete search history.

(56) References Cited

U.S. PATENT DOCUMENTS

| 2002/0091952 A1* | 7/2002 | Lin et al. ................... 713/300 |
| 2006/0092143 A1* | 5/2006 | Kasai et al. ................ 345/175 |
| 2007/0030255 A1* | 2/2007 | Pak et al. ................... 345/173 |
| 2007/0057887 A1* | 3/2007 | Itakura et al. ............... 345/90 |
| 2009/0002312 A1* | 1/2009 | Son ........................... 345/104 |
| 2009/0009155 A1* | 1/2009 | Hosokawa et al. ........ 324/76.38 |

FOREIGN PATENT DOCUMENTS

WO   WO 2007/102459   * 9/2007

* cited by examiner

*Primary Examiner* — Chanh Nguyen  
*Assistant Examiner* — Long D Pham  
(74) *Attorney, Agent, or Firm* — F. Chau & Associates, LLC

(57) ABSTRACT

A touch sensor configured to be disposed in a liquid crystal display panel includes a plurality of x-axis read-out lines crossing and insulated from a plurality of y-axis read-out lines and a plurality of sensor units. Each sensor unit includes a reset unit, a capacitance detector, a first output unit, and a second output unit. The reset unit outputs a first reset signal based on a first control signal. The capacitance detector changes the first reset signal based on a variation of a cell gap of the liquid crystal display panel caused by a touch event. The first output unit changes an electric potential of a corresponding x-axis read-out line in response to the first reset signal changed in the capacitance detector. The second output unit changes an electric potential of a corresponding y-axis read-out line in response to the first reset signal changed in the capacitance detector.

19 Claims, 6 Drawing Sheets

TOUCH SENSOR USING CAPACITANCE DETECTION AND LIQUID CRYSTAL DISPLAY HAVING THE SAME

CROSS-REFERENCE TO RELATED APPLICATION

This application claims priority to Korean Patent Application No. 2008-0069248, filed on Jul. 16, 2008, the disclosure of which is incorporated by reference in its entirety herein.

BACKGROUND

1. Technical Field

The present disclosure relates to a touch sensor and a liquid crystal display having the same. More particularly, the present disclosure relates to a touch sensor configured to be disposed within a liquid crystal display panel and a liquid crystal display having the touch sensor.

2. Discussion of the Related Art

A touch panel may be included in a display apparatus. A touch panel is a screen, which can detect the presence and location of a touch within the screen area. For example, a user can select an item displayed on a screen of the display apparatus using a finger, a hand, or an object, such as a stylus. The display apparatus may include a controller that is configured to detect a contact point through the touch panel. The controller receives information corresponding to the contact point as an input signal and operates the display apparatus according to the input signal. Since the display apparatus includes the touch panel, it does not require additional input devices (e.g., a keyboard, a mouse, etc.).

A touch panel may be used along with a liquid crystal display (LCD). For example, the touch panel may be disposed on top of a liquid crystal display panel, which displays an image, to receive input information from a user and detect position information. However, if the touch panel is provided separately (e.g., on top) from the liquid crystal display panel, optical characteristics (e.g., brightness, a viewing angle, etc.) of the LCD may be lowered. Further, the thickness of the LCD may be increased to an undesirable size due to the additional thickness of the touch panel.

Thus, there is a need for a touch screen that can be incorporated within a liquid crystal display panel of a liquid crystal display.

SUMMARY

In an exemplary embodiment of the present invention, a touch sensor is configured to be disposed within a liquid crystal display panel. The touch sensor includes a plurality of x-axis read-out lines, a plurality of y-axis read-out lines, and a plurality of sensor units. The y-axis read-out lines cross the x-axis read-out lines and are insulated from the x-axis read-out lines. The sensor units are respectively provided in a plurality of regions defined by the x-axis read-out lines and the y-axis read-out lines.

Each sensor unit includes a reset unit, a capacitance detector, a first output unit, and a second output unit. The reset unit outputs a first reset signal based on a first control signal. The capacitance detector changes the first reset signal based on a variation of a cell gap of the liquid crystal display panel caused by a touch event. The first output unit changes an electric potential of a corresponding x-axis read-out line in response to the first reset signal changed in the capacitance detector. The second output unit changes an electric potential of a corresponding y-axis read-out line in response to the first reset signal changed in the capacitance detector.

In another exemplary embodiment of the present invention, a liquid crystal display includes a liquid crystal display panel, a touch sensor, a coordinate detection circuit, and a driver. The liquid crystal display panel includes a plurality of pixels to display an image. The touch sensor is accommodated in the liquid crystal display panel to detect a touch event. The coordinate detection circuit is connected to the touch sensor to detect coordinates of a point at which a touch event occurs. The driver drives the liquid crystal display panel based on the coordinates.

The touch sensor includes a plurality of x-axis read-out lines, a plurality of y-axis read-out lines, and a plurality of sensor units. The y-axis read-out lines cross the x-axis read-out lines and are insulated from the x-axis read-out lines. The sensor units are respectively provided in a plurality of regions defined by the x-axis read-out lines and the y-axis read-out lines.

Each sensor unit includes a reset unit, a capacitance detector, a first output unit, and a second output unit. The reset unit outputs a first reset signal based on a first control signal. The capacitance detector changes the first reset signal based on a variation of a cell gap of the liquid crystal display panel caused by a touch event. The first output unit changes an electric potential of a corresponding x-axis read-out line in response to the first reset signal changed in the capacitance detector. The second output unit changes an electric potential of a corresponding y-axis read-out line in response to the first reset signal changed in the capacitance detector.

In at least one embodiment of the present invention, the touch sensor can convert a capacitance variation of its liquid crystal capacitor into a variation of a leakage current based on touch events by using its sensor unit. The touch sensor can magnify a difference between the touch event and the non-touch event to obtain a variation in the quantity of electric charges in parasitic capacitors connected to the x- and y-axes read-out lines. Accordingly, a voltage output from the touch sensor upon receipt of a touch event differs more greatly as compared with a voltage output from the touch sensor when a touch event is not encountered, thereby enabling the touch sensor to have an improved sensitivity.

BRIEF DESCRIPTION OF THE DRAWINGS

Exemplary embodiments of the present invention will become readily apparent by reference to the following detailed description when considered in conjunction with the accompanying drawings wherein.

DETAILED DESCRIPTION OF EXEMPLARY EMBODIMENTS

Hereinafter, exemplary embodiments of the present invention will be described in more detail with reference to the accompanying drawings. The use of the term 'about' with respect to a specified value for the below described parameters (e.g., channel width, channel length, period, voltages, capacitance, etc.) preferably means plus or minus ten percent of the specified value, more preferably plus or minus five percent of the specified value, and even more preferably plus or minus one percent of the specified value. For example, if the specified value of a voltage is 'about' 10V, the voltage preferably ranges from 9V to 11V, more preferably from 9.5V to 10.5V, and even more preferably from 9.9V to 10.9V.

Figure 1:
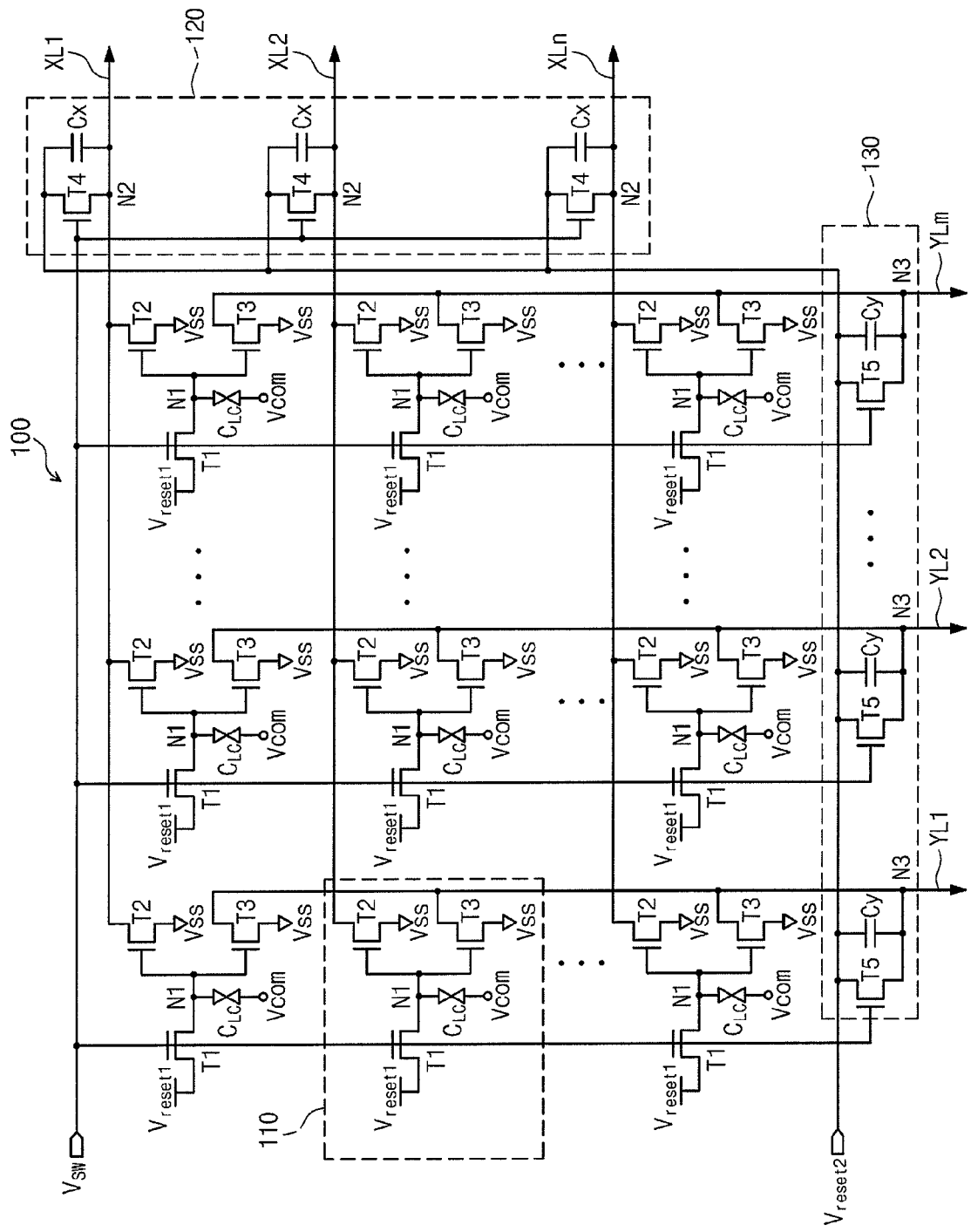
FIG. 1 is a circuit diagram showing a touch sensor according to an exemplary embodiment of the present invention.
Figure 2:
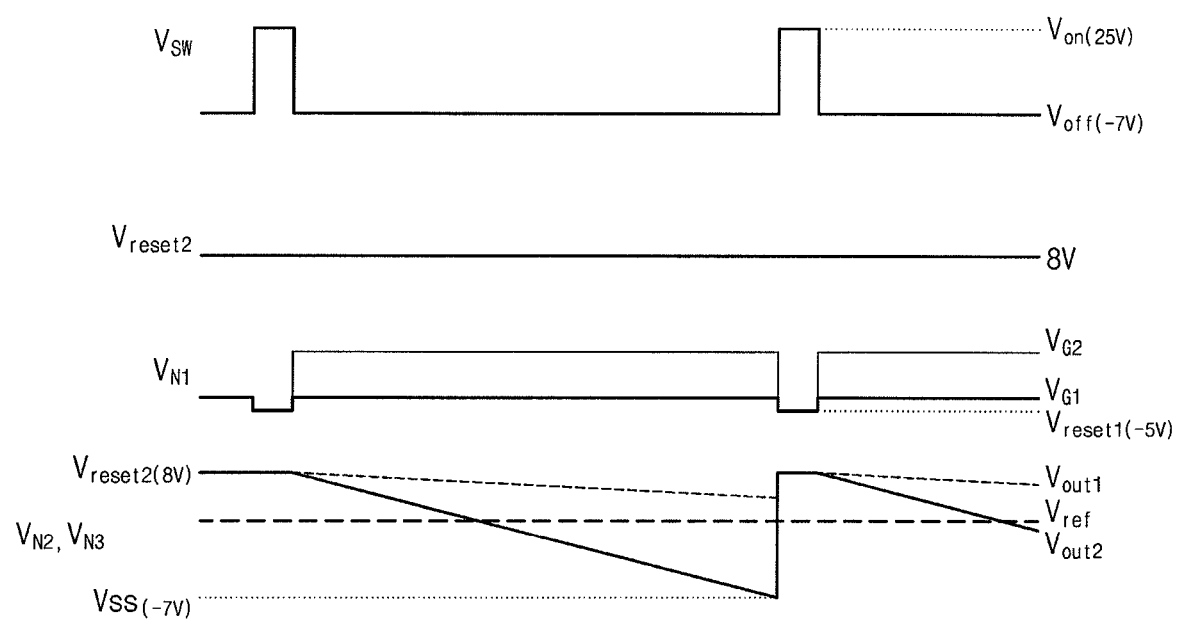
FIG. 2 is a timing diagram showing waveforms of signals of FIG. 1.

FIG. 1 is a circuit diagram showing a touch sensor according to an exemplary embodiment of the present invention. FIG. 2 is a timing diagram showing waveforms of signals of FIG. 1. Referring to FIGS. 1 and 2, a touch sensor 100 includes a plurality of x-axis read-out lines XL1 to XLn, a plurality of y-axis read-out lines YL1 to YLm crossing the x-axis read-out lines XL1 to XLn, and a plurality of sensor units 110. The x-axis read-out lines XL1 to XLn are insulated from the y-axis read-out lines YL1 to YLm. The plurality of sensor units 110 are provided in a plurality of areas defined by the x-axis read-out lines XL1 to XLn and the y-axis read-out lines YL1 to YLm. The touch sensor 100 may be disposed within a liquid crystal display panel (not shown) that displays an image. The touch sensor 100 may be selectively formed on a thin film transistor substrate (not shown) of the liquid crystal display panel using a thin film process. The thin film transistor substrate (not shown) may have a plurality of pixels of two substrates of the liquid crystal display panels.

In at least one exemplary embodiment of the present invention, n x-axis read-out lines XL1 to XLn and m y-axis read-out lines YL1 to YLm are provided on the thin film transistor substrate, and m×n sensor units 110 are arranged in the form of a matrix, where n and m are natural numbers.

Each sensor unit 110 includes a reset unit, a capacitance detector, and first and second output units. The reset unit includes a first transistor T1 having a control terminal receiving a switching voltage $V_{SW}$, an input terminal receiving a first reset voltage $V_{reset1}$, and an output terminal connected to a first node N1. The first transistor T1 may be formed on the thin film transistor substrate through a manufacturing process of a thin film transistor. The first transistor T1 may have a channel width of about 4 µm and a channel length of about 50 µm. However, the channel lengths and widths of the first transistor T1 are not limited thereto.

The first transistor T1 is turned on when the switching voltage $V_{SW}$ has a high level during a reset duration. As shown in FIG. 2, the switching voltage $V_{SW}$ has a high duration repeatedly occurring at a predetermined interval. In at least one exemplary embodiment of the present invention, the switching voltage $V_{SW}$ has a period of about 20 µs. However, the switching voltage $V_{SW}$ is not limited thereto.

The switching voltage $V_{SW}$ has an on-voltage $V_{on}$ for the high duration, and has an off-voltage $V_{off}$ for low duration. In at least one embodiment of the present invention, the on-voltage $V_{on}$ is about 25V, and the off-voltage $V_{off}$ is about −7V. However, the on and off voltages $V_{on}$ and $V_{off}$ are not limited thereto. If the first transistor T1 is turned on for the high duration of the switching voltage $V_{SW}$, an electric potential $V_{N1}$ of the first node N1 is initialized to the first reset voltage $V_{reset1}$. In this example, the first reset voltage $V_{reset1}$ has a voltage level of about −5V. However, the first reset voltage $V_{reset1}$ is not limited thereto.

The capacitance detector includes a liquid crystal capacitor $C_{LC}$ electrically connected between a first electrode connected to the first node N1 and a second electrode receiving a common voltage Vcom. The liquid crystal capacitor $C_{LC}$ may be different from a liquid crystal capacitor formed in each pixel of the liquid crystal display panel. Although not shown in FIGS. 1 and 2, the first electrode of the liquid crystal capacitor $C_{LC}$ of the touch sensor 100 may include or be made of the same material as that of the pixel electrode of each pixel, and may be formed through a similar or identical process to that of the pixel electrode. The second electrode may be provided on a top substrate of the liquid crystal display panel and include a common electrode receiving the common voltage Vcom.

The liquid crystal capacitor $C_{LC}$ changes the electric potential $V_{N1}$ of the first node N1 initialized to the first reset voltage $V_{reset1}$ based on a cell gap of the liquid crystal display panel that is changed by a touch event.

The common voltage Vcom may have a voltage level of about 6V. However, the common voltage Vcom is not limited thereto. The capacitance of the liquid crystal capacitor $C_{LC}$ changes when a touch event occurs and remains relatively constant when a touch event does not occur. Accordingly, the electric potential $V_{N1}$ of the first node N1 may transition to a first gate voltage $V_{G1}$ that is higher than the first reset voltage $V_{reset1}$. The difference between the first reset voltage $V_{reset1}$ and the first gate voltage $V_{G1}$ may vary depending on the coupling of the first transistor T1 and a switching signal caused by a parasitic capacitor.

When a touch event occurs, the capacitance of the liquid crystal capacitor $C_{LC}$ increases due to the reduction of a cell gap, so that the electric potential $V_{N1}$ of the first node N1 increases to a second gate voltage $V_{G2}$, that is higher than the first gate voltage $V_{G1}$.

The first output unit includes a second transistor T2 having a control terminal connected to a respective one of the first nodes N1, an input terminal receiving a source supply voltage Vss, and an output terminal connected to a respective one of the x-axis read-out lines XL1 to XLn. The second output unit includes a third transistor T3 having a control terminal connected to a respective one of the first nodes N1, an input terminal receiving the source supply voltage Vss, and an output terminal connected to a respective one of the y-axis read-out lines YL1 to YLm. In an exemplary embodiment of the present invention, each of the second and third transistors T2 and T3 has a channel width of about 4 µm and a channel length of about 100 µm. However, the channel widths and lengths of the second and third transistors T2 and T3 is not limited thereto.

If a touch event does not occur, the second and third transistors T2 and T3 are turned off by the first gate voltage $V_{G1}$. However, if a touch event occurs, the second and third transistors T2 and T3 are turned on by the second gate voltage $V_{G2}$.

Figure 3:
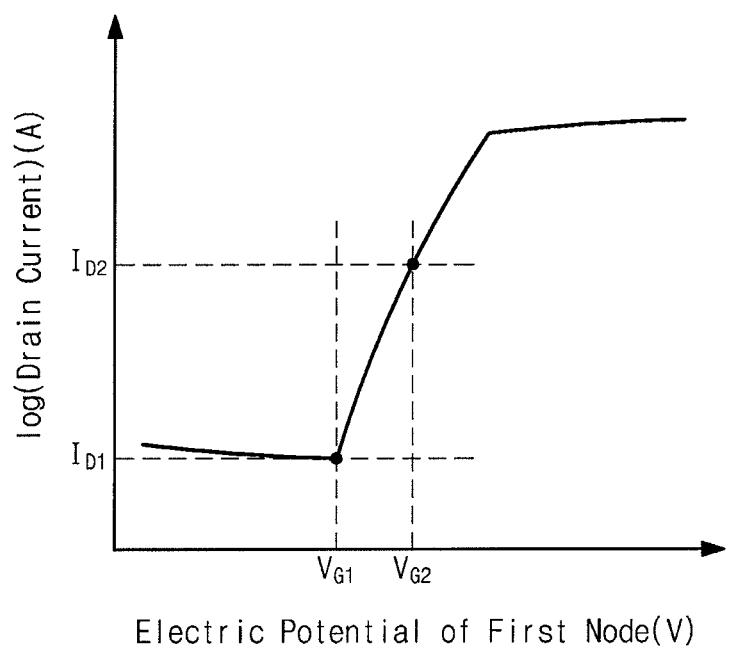
FIG. 3 is a graph showing a variation of drain currents of second and third transistors as a function of an electric potential of a first node.

FIG. 3 is a graph showing a variation of drain currents of the second and third transistors T2 and T3 as a function of the electric potential $V_{N1}$ of the first node N1. Referring to FIG. 3, if the electric potential $V_{N1}$ of the first node N1 rises from the first gate voltage $V_{G1}$ to the second gate voltage $V_{G2}$, the drain currents of the second and third transistors T2 and T3 exponentially rise from a first current value $I_{D1}$ to a second current value $I_{D2}$.

The increase of the drain currents of the second and third transistors T2 and T3 means that a current value leaking through the second and third transistors T2 and T3 increases. Accordingly, as shown in FIG. 2 and 3, if the touch event occurs, the drain current rises higher as compared to when the touch event does not occur. Accordingly, an electric potential $V_{N2}$ of a second node N2 disposed on a respective one of the x-axis read-out lines XL1 to XLn and an electric potential $V_{N3}$ of a third node N3 disposed on a respective one of the y-axis read-out lines YL1 to YLm decrease. Referring again to FIG. 1, the touch sensor 100 includes a plurality of first line reset units 120 corresponding to the x-axis read-out lines XL1 to XLn and a plurality of second line reset units 130 corresponding to the y-axis read-out lines YL1 to YLm.

The first line reset units 120 output a second reset voltage $V_{reset2}$ to the x-axis read-out lines XL1 to XLn based on the switching voltage $V_{SW}$, and the second line reset units 130 output the second reset voltage $V_{reset2}$ to the y-axis read-out lines YL1 to YLm based on the switching voltage $V_{SW}$.

The first line reset units 120 include fourth transistors T4. Each of the fourth transistors T4 include a control terminal receiving the switching voltage $V_{SW}$, an input terminal receiving the second reset voltage $V_{reset2}$, and an output terminal connected to a corresponding one of the x-axis read-out lines XL1 to XLn. The first line reset units 120 may further include a plurality of x-axis parasitic capacitors Cx respectively connected to the x-axis read-out lines XL1 to XLn.

The second line reset units 130 include fifth transistors T5. Each of the fifth transistors T5 include a control terminal receiving the switching terminal $V_{SW}$, an input terminal receiving the second reset voltage $V_{reset2}$ and an output terminal connected to a corresponding one of the y-axis read-out lines YL1 to YLm. The second line reset units 130 may further include a plurality of y-axis parasitic capacitors Cy respectively connected to the y-axis read-out lines YL1 to YLm.

In at least one exemplary embodiment of the present invention, the x-axis parasitic capacitors Cx and the y-axis parasitic capacitors Cy have capacitances greater than that of the liquid crystal capacitor $C_{LC}$. For example, if the liquid crystal capacitor $C_{LC}$ has capacitance of about 0.3 pF, the x-axis parasitic capacitors Cx and y-axis parasitic capacitors Cy may have capacitance of about 150 pF. However, the capacitances of the parasitic capacitors Cx and Cy and the liquid crystal capacitor $C_{LC}$ are not limited thereto.

As shown in FIG. 2, the fourth and fifth transistors T4 and T5 are turned on for the high duration of the switching voltage $V_{SW}$, and the electric potentials $V_{N2}$ and $V_{N3}$ of the second and third nodes N2 and N3 are initialized to the second reset voltage $V_{reset2}$ due to the fourth and fifth transistors T4 and T5. In at least one exemplary embodiment of the present invention, the second reset voltage $V_{reset2}$ has a voltage level of about 8V. However, the second reset voltage $V_{reset2}$ is not limited thereto. The x- and y-axes parasitic capacitors Cx and Cy are charged with initial charges by the second reset voltage $V_{reset2}$.

When a touch event occurs at a point within an area of a sensor unit 110, the drain current of the corresponding second transistor T2 increases. The second transistor T2 is connected to a corresponding one of the x-axis read-out lines XL1 to XLn. The quantity of charges in the x-axis parasitic capacitor Cx connected to the corresponding x-axis read-out line is reduced. Similarly, the drain current of the corresponding third transistor T3 also increases. The third transistor T3 is connected to a corresponding one of the y-axis read-out lines YL1 to YLm. The quantity of charges in the y-axis parasitic capacitor Cy connected to the corresponding y-axis read-out line is reduced.

If the quantity of charges of the x- and y-axes parasitic capacitors Cx and Cy corresponding to a point in which a touch event occurs is reduced, the electric potentials $V_{N2}$ and $V_{N3}$ of the second and third nodes N2 and N3 are gradually reduced from the second reset voltage $V_{reset2}$. The electric potentials $V_{N2}$ and $V_{N3}$ of the second and third nodes N2 and N3 corresponding to points in which touch event occur are reduced significantly more than electric potentials of nodes corresponding to points in which touch events do not occur.

Although not shown in FIGS. 1 to 3, comparators may be connected to the x-axis read-out lines XL1 to XLn and the y-axis read-out lines YL1 to YLm to compare the electric potentials $V_{N2}$ and $V_{N3}$ of the second and third nodes N2 and N3 with a preset reference voltage Vref. Accordingly, if the electric potentials $V_{N2}$ and $V_{N3}$ of the second and third nodes N2 and N3 are greater than the preset reference voltage Vref, it may be determined that the touch event has not occurred. If the electric potentials $V_{N2}$ and $V_{N3}$ of the second and third nodes N2 and N3 are less than the preset reference voltage Vref, it may be determined that the touch event has occurred. A coordinate detection circuit that may be provided external to the liquid crystal display panel to receive outputs of the touch sensor 100 and detect coordinates of a point in which a touch event occurs will be described later in more detail with reference to FIG. 6.

Since the x- and y-axes parasitic capacitors Cx and Cy may have a capacitance greater than that of the liquid crystal capacitor $C_{LC}$ as described above, even if the capacitance of the liquid crystal capacitor $C_{LC}$ is slightly changed due to a touch operation, the electric potentials $V_{N2}$ and $V_{N3}$ of the second and third nodes N2 and N3 may be greatly changed. The variation of the electric potentials $V_{N2}$ and $V_{N3}$ of the second and third nodes N2 and N3 may be changed according to the capacitance of the x- and y-axes parasitic capacitors Cx and Cy, the second reset voltage $V_{reset2}$, and the source supply voltage Vss. As described above, since a voltage variation of read-out terminals increases due to a touch event, sensitivity of the touch sensor 100 can be improved.

Figure 4:
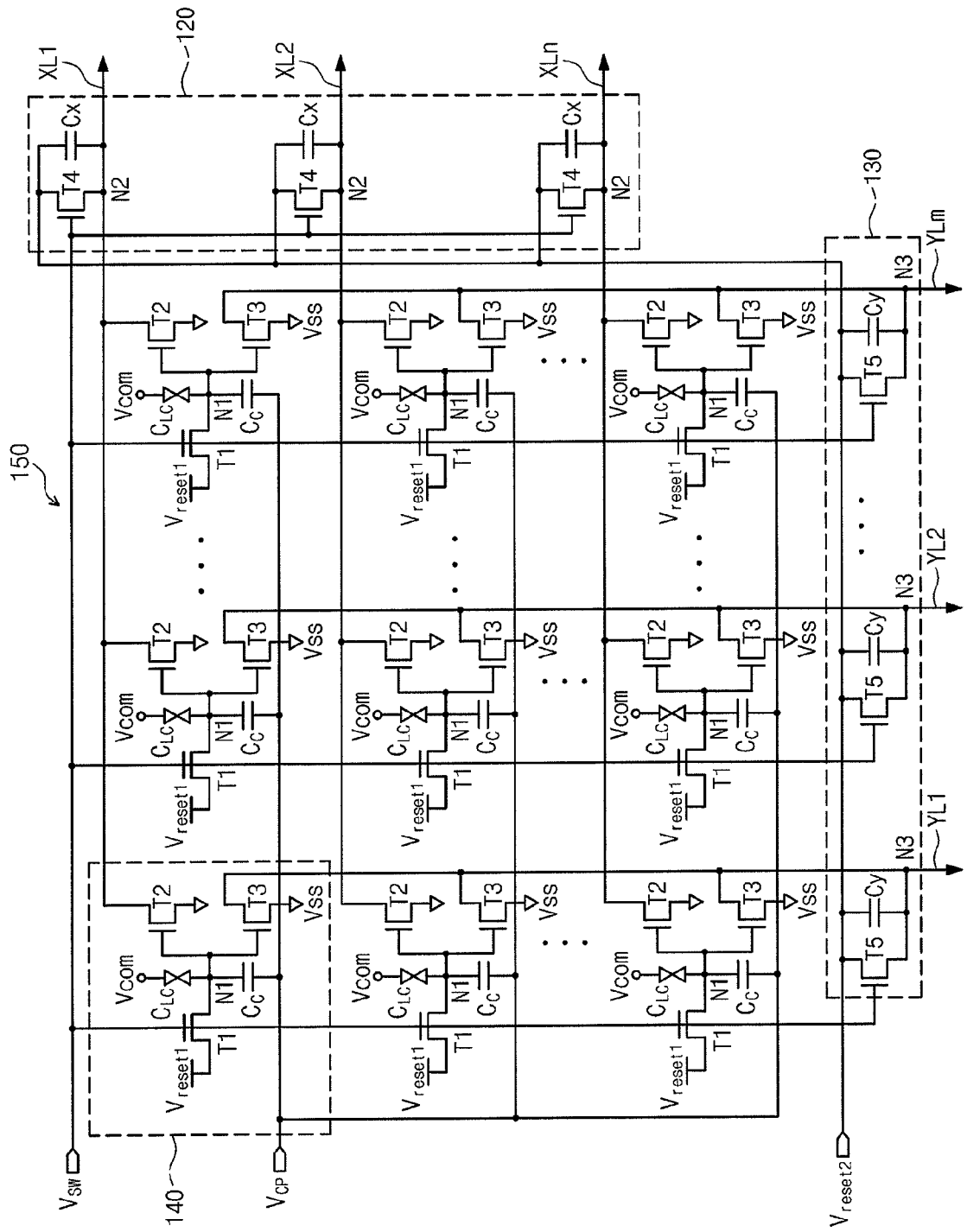
FIG. 4 is a circuit diagram showing a touch sensor according to another exemplary embodiment of the present invention.
Figure 5:
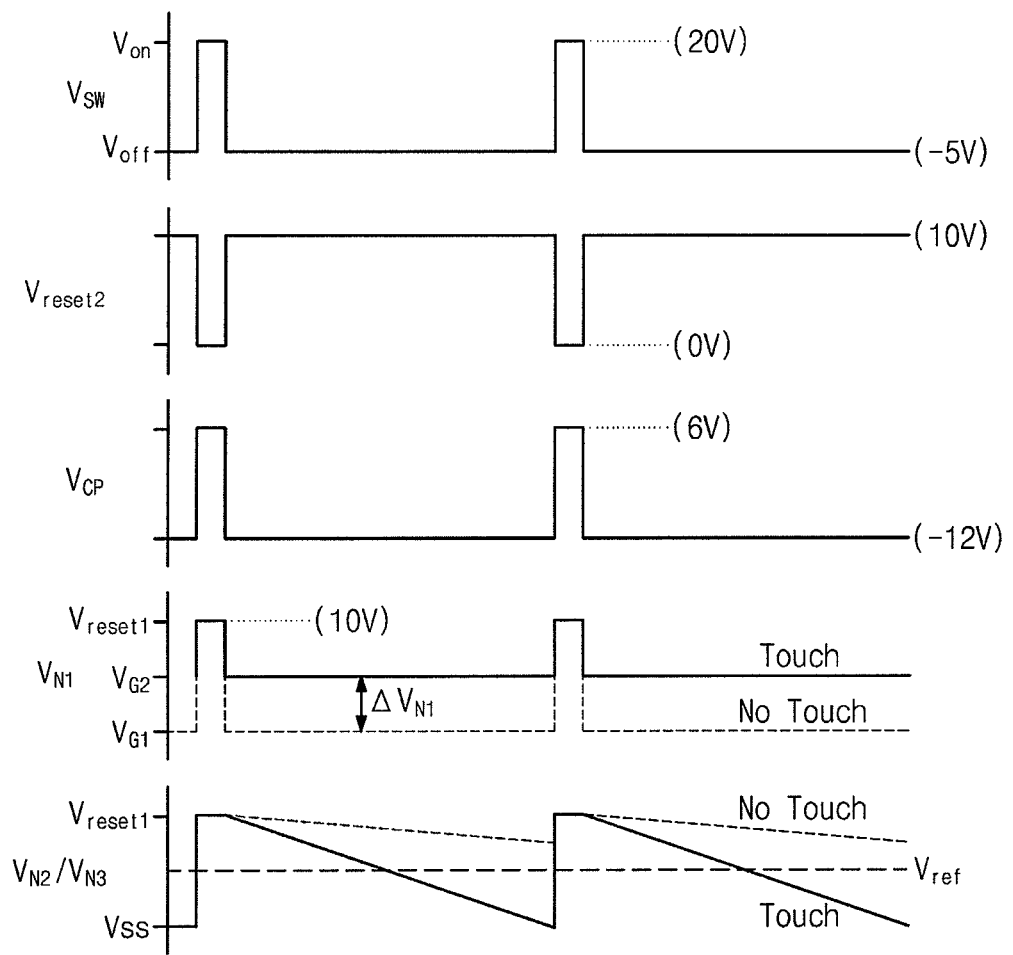
FIG. 5 is a timing diagram showing waveforms of signals of FIG. 4.

FIG. 4 is a circuit diagram showing a touch sensor according to another exemplary embodiment of the present invention. FIG. 5 is a timing diagram showing waveforms of signals of FIG. 4. In FIG. 4, the same reference numerals denote the same elements in FIG. 1, and thus a detailed description of the same elements will be omitted in order to avoid redundancy.

Referring to FIG. 4, a touch sensor 150 includes x-axis read-out lines XL1 to XLn, y-axis read-out lines YL1 to YLm crossing the x-axis read-out lines XL1 to XLn, and sensor units 140. The x-axis read-out lines XL1 to XLn are insulated from the y-axis read-out lines YL1 to YLM. The sensor units 140 are provided in a plurality of areas defined by the x-axis read-out lines XL1 to XLn and the y-axis read-out lines YL1 to YLm.

Each sensor unit 140 includes a reset unit, a capacitance detector, and the first and second output units. Since the reset unit and the first and second output units have the same circuit configuration as those of FIG. 1, details of the reset unit and the first and second output units will be omitted.

The capacitance detector includes the liquid crystal capacitor $C_{LC}$ and a coupling capacitor $C_c$. The liquid crystal capacitor $C_{LC}$ is electrically between the first electrode connected to the first node N1 and the second electrode receiving the common voltage Vcom. The coupling capacitor $C_c$ is electrically connected between a first electrode connected to the first node N1 and a second electrode receiving a control voltage $V_{CP}$.

As shown in FIG. 5, the control voltage $V_{CP}$ may have the same period and phase as that of the switching voltage $V_{SW}$ applied from the reset unit. In at least one exemplary embodiment of the present invention, the control voltage $V_{CP}$ has the same voltage level as the common voltage Vcom (e.g., 6V) for a high duration, and maintains a level (e.g., −12V) of a coupling voltage $V_{cc}$ for a low duration.

After the electric potential $V_{N1}$ of the second node N1 is initialized to the first reset voltage $V_{reset1}$ by the reset unit for the high duration of the switching voltage $V_{SW}$, if a cell gap at a predetermined point of the liquid crystal display panel is reduced due to the touch event, the capacitance of the liquid crystal capacitor $C_{LC}$ corresponding to the point increases.

If the touch event does not occur, the quantity of charges in the liquid crystal capacitor $C_{LC}$ may be defined by Equation 1 as follows:

$$Q_{LC} = C_{LC}(V_{reset1} - Vcom) + C_C(V_{reset1} - Vcom) = \qquad \text{(Equation 1)}$$
$$C_{LC}(V_{G1} - Vcom) + C_C(V_{G1} - V_{CC}),$$

where the first gate voltage $V_{G1}$ represents the potential $V_{N1}$ of the first node N1 when a touch event does not occur. The first gate voltage $V_{G1}$ of Equation 1 may be determined by Equation 2 as follows:

$$V_{G1} = V_{reset1} - \frac{C_C}{C_{LC} + C_C}(Vcom - V_{CC}). \qquad \text{(Equation 2)}$$

If a touch event causes the capacitance of the liquid crystal capacitor $C_{LC}$ to change, the quantity of charges in the liquid crystal capacitor $C_{LC}$ may be determined by Equation 3 as follows:

$$\alpha Q_{LC} = \alpha C_{LC}(V_{reset1} - Vcom) + C_C(V_{reset1} - Vcom) = \qquad \text{(Equation 3)}$$
$$\alpha C_{LC}(V_{G2} - Vcom) + C_C(V_{G2} - V_{CC}),$$

where $\alpha C_{LC}$ denotes the capacitance of the liquid crystal capacitor $C_{LC}$ changed due to a touch operation, and the second gate voltage $V_{G2}$ represents the electric potential $V_{N1}$ of the first node N1 when the touch event occurs. The second gate voltage $V_{G2}$ of Equation 3 may be determined by Equation 4 as follow:

$$V_{G2} = V_{reset1} - \frac{C_C}{\alpha C_{LC} + C_C}(Vcom - V_{CC}). \qquad \text{(Equation 4)}$$

Variation $\Delta V_{N1}$ of the electric potential $V_{N1}$ of the first node N1 may be determined by Equation 5 as follows:

$$\Delta V_{N1} = V_{G2} - V_{G1} = \frac{(\alpha - 1)C_{LC}C_C}{(\alpha C_{LC} + C_C)(C_{LC} + C_C)}(Vcom - V_{cc}) \qquad \text{(Equation 5)}$$

If the touch event occurs, the electric potential $V_{N1}$ of the first node N1 is changed by the variation $\Delta V_{N1}$ described in Equation 5. The variation $\Delta V_{N1}$ of the electric potential $V_{N1}$ of the first node N1 may be changed according to the size of the coupling capacitor $C_c$. Accordingly, the sensitivity of the touch sensor 150 may be improved by adjusting the size of the coupling capacitor $C_c$ such that the variation $\Delta V_{N1}$ is increased.

Figure 6:
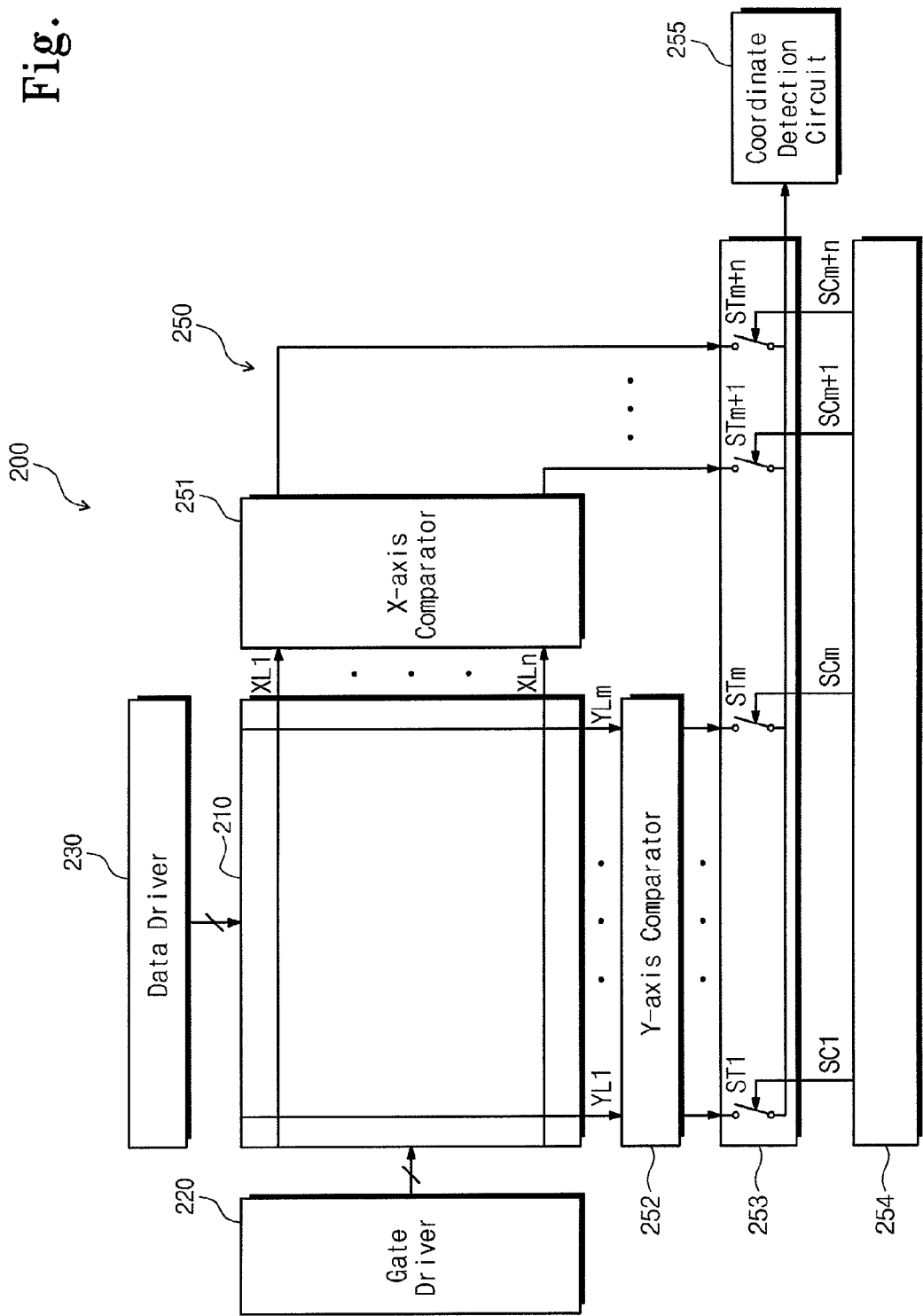
FIG. 6 is a block diagram showing a liquid crystal display according to an exemplary embodiment of the present invention.

FIG. 6 is a block diagram showing a liquid crystal display 200 according to an exemplary embodiment of the present invention. Referring to FIG. 6, a liquid crystal display 200 includes a liquid crystal display panel 210, a gate driver 220, and a data driver 230.

The liquid crystal display panel 210 includes a plurality of pixels to display an image. Although not shown in FIG. 6, the liquid crystal display panel 210 includes a plurality of gate lines and a plurality of data lines. The pixels may be provided in a plurality of areas defined by the gate lines and the data lines. Each pixel includes a thin film transistor connected to a corresponding gate line of the gate lines and a corresponding data line of the data lines, and a liquid crystal capacitor connected to an output terminal of a corresponding thin film transistor of the thin film transistors.

The gate driver 220 is electrically connected to the gate lines provided in the liquid crystal display panel 210. The gate driver 220 may sequentially apply gate signals to the gate lines. The data driver 230 is electrically connected to the data lines provided in the liquid crystal display panel 210 to apply data signals to the data lines. When the thin film transistors are turned on in response to the gate signals, the data signals are applied to the liquid crystal capacitors. Voltages charged in the liquid crystal capacitors are changed according to the data signals, so that the light transmittance of liquid crystal is controlled depending on the voltages. The liquid crystal display panel 210 can display an image having a desired gray scale by controlling the light transmittance of the liquid crystal as described above.

The liquid crystal display panel 210 includes either the touch sensor 100 of FIG. 1 or the touch sensor 150 of FIG. 4 to detect a touch event. Since the structure of the touch sensors 100 and 150 have been described with reference to FIGS. 1 to 5, the details thereof will be omitted in order to avoid redundancy.

The touch sensor 100 or 150 is connected to a coordinate detection circuit 250 to detect coordinates of a point at which a touch event occurs. The coordinate detection circuit 250 includes an x-axis comparator 251 connected to the x-axis read-out lines XL1 to XLn provided in the liquid crystal display panel 210 and an y-axis comparator 252 connected to the y-axis read-out lines YL1 to YLm provided in the liquid crystal display panel 210.

The x-axis comparator 251 may include n first operational amplifiers (OP amplifier), where n is a natural number that corresponds to the number n of x-axis read-out lines XL1 to XLn. Each of the n first OP amplifiers are connected to a corresponding one of the n x-axis read-out lines XL1 to XLn. The first OP amplifiers compare first voltages output from the x-axis read-out lines XL1 to XLn with a preset reference voltage. The y-axis comparator 252 includes m second OP amplifiers, where m is a natural number that corresponds to the number m of y-axis read-out lines YL1 to YLm. Each of the m second OP amplifiers are connected to a corresponding one of the y-axis read-out lines YL1 to YLm. The second OP amplifiers compare second voltages output from the y-axis read-out lines YL1 to YLm with the preset reference voltage.

As shown in FIG. 5, if the voltages $V_{N2}$ and $V_{N3}$ output from the x-axis read-out lines XL1 to XLn and the y-axis read-out lines YL1 to YLm are smaller than the preset reference voltage Vref, the first and second OP amplifiers output first result signals. If the voltages output from the x-axis read-out lines XL1 to XLn and the y-axis read-out lines YL1 to YLm are greater than the preset reference voltage Vref, the first and second OP amplifiers output second result signals.

The coordinate detection circuit 250 further includes a multiplexer 253, which is connected to both the x-axis comparator 251 and the y-axis comparator 252, and a scan circuit 254 connected to the multiplexer 253.

The multiplexer 253 includes m switching elements ST1 to STm connected to an output terminal of the y-axis comparator 252 and n switching elements STm+1 to STm+n connected to an output terminal of the x-axis comparator 251. Output terminals of the m+n switching elements ST1 to STm+n may be commonly connected to each other. The m+n switching elements ST1 to STm+n may be sequentially turned on in response to m+n switching signals SC1 to SCm+n sequentially applied from the scan circuit 254. The time required to sequentially generate the first switch signal SC1 to the (m+n)$^{th}$ switch signal SCm+n may correspond to one frame.

Accordingly, the multiplexer 253 sequentially outputs signals applied from the x-axis comparator 251 and the y-axis comparator 252 through the m+n switching elements ST1 to STm+n. The coordinate detection circuit 250 further includes a coordinate generator 255 to generate coordinates of a point, at which the touch event occurs, based on the signal sequentially output from the multiplexer 253.

According to another exemplary embodiment of the present invention, the coordinate detection circuit 250 may include the x-axis comparator 251, the y-axis comparator 252, a latch unit (not shown), and the coordinate generator 255. The latch unit includes m+n latches to store the n+m signals output from the x-axis comparator 251 and the y-axis comparator 252. The coordinate generator 255 can read out signals stored in the n+m latches at a specific time point, and generate coordinates of a point, at which a touch event occurs, based on the read-out signals.

The coordinate detection circuit 250 is not limited to the above structure. The coordinate detection circuit 250 can be realized through various schemes to generate coordinates of a point at which a touch event occurs.

In at least one embodiment of the present invention a touch sensor (e.g., 100 or 150) amplifies a variation of a leakage current of a sensor unit (e.g., 110 or 140) based on a capacitance variation of the liquid crystal capacitor $C_{LC}$ caused by a touch event, so that the quantity of charges of parasitic capacitors connected to x- and y-axes read-out lines is changed.

Although exemplary embodiments of the present invention have been described, it is understood that the present invention is not be limited to these exemplary embodiments, but various changes and modifications can be made by one ordinary skilled in the art within the spirit and scope of the present disclosure.

What is claimed is:

1. A touch sensor configured to be disposed within a liquid crystal display panel, the touch sensor comprising:
a plurality of x-axis read-out lines;
a plurality of y-axis read-out lines crossing the x-axis read-out lines, wherein the x-axis read-out lines are insulated from the y-axis read-out lines;
a plurality of sensor units provided in a plurality of regions defined by the x-axis read-out lines and the y-axis read-out lines,
wherein each sensor unit comprises:
a reset unit having a first transistor, wherein the first transistor comprising a control terminal receiving a first control signal, an input terminal receiving a first reset signal and an output terminal outputting the first reset signal based on the first control signal;
a capacitance detector having a liquid crystal capacitor that changes the first reset signal based on a variation of a cell gap of the liquid crystal display panel caused by a touch event, wherein the output terminal of the first transistor is directly connected to a first electrode of the liquid crystal capacitor;
a first output unit having a second transistor that changes an electric potential of a corresponding x-axis read-out line in response to the first reset signal changed in the liquid crystal capacitor; and
a second output unit having a third transistor that changes an electric potential of a corresponding y-axis read-out line in response to the first reset signal changed in the liquid crystal capacitor; and a line reset unit comprising:
a fourth transistor comprising a control terminal receiving the first control signal, an input terminal directly receiving a second reset signal, and an output terminal directly connected to one of the x-axis and y-axis read-out lines; and
a first capacitor connected in parallel with the fourth transistor between the input and output terminals.

2. The touch sensor of claim 1, wherein the first electrode of the liquid crystal capacitor is connected to a node connecting a control terminal of the first and second output units to an output terminal of the reset unit, and a second electrode receiving a common voltage.

3. The touch sensor of claim 2, wherein the first control signal has a high duration repeatedly occurring at a predetermined period, and the reset unit is turned on for the high duration to initialize the node with the first reset signal.

4. The touch sensor of claim 2, wherein the output terminal of the reset unit is connected to the node.

5. The touch sensor of claim 4, wherein the second transistor comprising a control terminal connected to the node, an input terminal receiving a source supply voltage, and an output terminal connected to the corresponding x-axis read-out line, and the third transistor comprising a control terminal connected to the node, an input terminal receiving the source supply voltage, and an output terminal connected to the corresponding y-axis read-out line.

6. The touch sensor of claim 2, wherein the capacitance detector further comprises a coupling capacitor comprising a first electrode connected to the node and a second electrode connected to a terminal receiving a second control signal.

7. The touch sensor of claim 6, wherein the second control signal has a high duration repeatedly occurring at a predetermined period, and has a voltage level identical to a voltage level of the common voltage for the high duration.

8. The touch sensor of claim 7, wherein the first control signal has a period identical to a period of the second control signal.

9. The touch sensor of claim 1, further comprising:
a plurality of the line reset units configured to output the second reset signal to the x-axis read-out lines based on the first control signal; and
a plurality of the line reset units configured to output the second reset signal to the y-axis read-out lines based on the first control signal.

10. The touch sensor of claim 1, wherein the capacitance of the first capacitor is greater than that of the liquid crystal capacitor.

11. A liquid crystal display comprising:
a liquid crystal display panel that comprises a plurality of pixels to display an image;
a touch sensor disposed within the liquid crystal display panel to detect a touch event;
a coordinate detection circuit connected to the touch sensor to detect coordinates of a point at which a touch event occurs; and
a driver that drives the liquid crystal display panel based on the coordinates,
wherein the touch sensor comprises:
a plurality of x-axis read-out lines;
a plurality of y-axis read-out lines crossing the x-axis read-out lines, wherein the x-axis read-out lines are insulated from the y-axis read-out lines; and a plurality of sensor units provided in a plurality of regions defined by the x-axis read-out lines and the y-axis read-out lines, wherein each sensor unit comprises:

a reset unit having a first transistor, wherein the first transistor comprising a control terminal receiving a first control signal, an input terminal receiving a first reset signal and an output terminal outputting the first reset signal based on the first control signal;

a capacitance detector having a liquid crystal capacitor that changes the first reset signal based on a variation of a cell gap of the liquid crystal display panel caused by a touch event, wherein the output terminal of the first transistor is directly connected to a first electrode of the liquid crystal capacitor;

a first output unit having a second transistor that changes an electric potential of a corresponding x-axis read-out line in response to the first reset signal changed in the liquid crystal capacitor;

a second output unit having a third transistor that changes an electric potential of a corresponding y-axis read-out line in response to the first reset signal changed in the liquid crystal capacitor; and a line reset unit comprising:

a fourth transistor comprising a control terminal receiving the first control signal, an input terminal directly receiving a second reset signal, and an output terminal directly connected to one of the x-axis and y-axis read out lines; and a first capacitor connected in parallel with the fourth transistor between the input and output terminals, wherein the first capacitor having a capacitance greater than that of the liquid crystal capacitor.

12. The liquid crystal display of claim 11, wherein the liquid crystal capacitor is disposed in the liquid crystal display panel, and the first electrode of the liquid crystal capacitor is connected to a node connecting a control terminal of the first and second output units to the output terminal of the reset unit, and a second electrode receiving a common voltage.

13. The liquid crystal display of claim 12, wherein the output terminal of the first transistor is connected to the node.

14. The liquid crystal display of claim 13, wherein the second transistor comprising a control terminal connected to the node, an input terminal receiving a first voltage, and an output terminal connected to the corresponding x-axis read-out line, and the third transistor comprising a control terminal connected to the node, an input terminal receiving the first voltage, and an output terminal connected to the corresponding y-axis read-out line.

15. The liquid crystal display of claim 12, wherein the capacitance detector further comprises a coupling capacitor comprising a first electrode connected to the node and a second electrode connected to a terminal receiving a second control signal.

16. The liquid crystal display of claim 11, wherein the touch sensor comprises:

a first plurality of the line reset units configured to output the second reset signal to the x-axis read-out lines based on the first control signal; and a second plurality of the line reset units configured to output the second reset signal to the y-axis read-out lines based on the first control signal.

17. The liquid crystal display of claim 16, wherein each of the first plurality of the line reset units comprises a fifth transistor comprising a control terminal receiving the first control signal, an input terminal receiving the second reset signal, and an output terminal connected to a corresponding x-axis read-out line of the x-axis read-out lines, and each of the second plurality of the line reset units comprises a sixth transistor comprising a control terminal receiving the first control signal, an input terminal receiving the second reset signal, and an output terminal connected to a corresponding y-axis read-out line of the y-axis read-out lines.

18. The liquid crystal display of claim 11, wherein the coordinate detection circuit comprises:

an x-axis comparator that is connected to the x-axis read-out lines, and compares signals output from the x-axis read-out lines with a preset reference signal to output a first comparative signal; a y-axis comparator that is connected to the y-axis read-out lines, and compares signals output from the y-axis read-out lines with the preset reference signal to output a second comparative signal; and a coordinate generator that generates coordinates of a point, at which the touch event occurs, based on the first and second comparative signals.

19. A liquid crystal display comprising:

a liquid crystal display panel that comprises a plurality of pixels to display an image;

a touch sensor disposed within the liquid crystal display panel to detect a touch event;

a coordinate detection circuit connected to the touch sensor to detect coordinates of a point at which a touch event occurs; and a driver that drives the liquid crystal display panel based on the coordinates, wherein the touch sensor comprises:

a plurality of x-axis read-out lines;

a plurality of y-axis read-out lines crossing the x-axis read-out lines, wherein the x- axis read-out lines are insulated from the y-axis read-out lines; and a plurality of sensor units provided in a plurality of regions defined by the x-axis read-out lines and the y-axis read-out lines, wherein each sensor unit comprises:

a reset unit having a first transistor, wherein the first transistor comprising a control terminal receiving a first control signal, an input terminal receiving a first reset signal and an output terminal outputting the first reset signal based on the first control signal;

a capacitance detector having a liquid crystal capacitor that changes the first reset signal based on a variation of a cell gap of the liquid crystal display panel caused by a touch event, wherein the output terminal of the first transistor is directly connected to a first electrode of the liquid crystal capacitor;

a first output unit having a second transistor that changes an electric potential of a corresponding x-axis read-out line in response to the first reset signal changed in the liquid crystal capacitor;

a second output unit having a third transistor that changes an electric potential of a corresponding y-axis read-out line in response to the first reset signal changed in the liquid crystal capacitor; and a line reset unit comprising:

a fourth transistor comprising a control terminal receiving the first control signal, an input terminal directly receiving a second reset signal, and an output terminal directly connected to one of the x-axis and y-axis read out lines; and a first capacitor connected in parallel with the fourth transistor between the input and output terminals, wherein the coordinate detection circuit comprises:

an x-axis comparator that is connected to the x-axis read-out lines, and compares signals output from the x-axis read-out lines with a preset reference signal to output a first comparative signal;
a y-axis comparator that is connected to the y-axis read-out lines, and compares signals output from the y-axis read-out lines with the preset reference signal to output a second comparative signal; and
a coordinate generator that generates coordinates of a point, at which the touch event occurs, based on the first and second comparative signals.

* * * * *